United States Patent [19]

Shibata et al.

[11] Patent Number: 5,483,457
[45] Date of Patent: Jan. 9, 1996

[54] VEHICLE NAVIGATION SYSTEM USING GPS INCLUDING CORRECTION OF COEFFICIENTS FOR VELOCITY SENSOR

[75] Inventors: Akihito Shibata; Hiroaki Tsuji; Yoichiro Suga, all of Yokohama, Japan

[73] Assignee: Matsushita Electric Industrial Co., Ltd., Osaka, Japan

[21] Appl. No.: 963,751

[22] Filed: Oct. 20, 1992

[30] Foreign Application Priority Data

Oct. 25, 1991 [JP] Japan .................................. 3-279220

[51] Int. Cl.⁶ .............................................. G06F 165/00
[52] U.S. Cl. .......................... 364/454; 364/449; 364/450
[58] Field of Search .................................. 364/450, 449, 364/457, 454, 571.01, 571.02; 340/988; 342/450, 451, 357, 457

[56] References Cited

U.S. PATENT DOCUMENTS

| | | | |
|---|---|---|---|
| 4,713,767 | 12/1987 | Sato et al. | 364/453 |
| 5,155,688 | 10/1992 | Tanaka et al. | 364/454 |
| 5,220,509 | 6/1993 | Takemura et al. | 364/449 |
| 5,317,515 | 5/1994 | Matsuzaki | 364/454 |

FOREIGN PATENT DOCUMENTS

| | | |
|---|---|---|
| 62-279720 | 12/1987 | Japan . |
| 63-262518 | 10/1988 | Japan . |
| 2107985 | 4/1990 | Japan . |
| 298533 | 8/1990 | Japan . |
| 2212714 | 8/1990 | Japan . |

OTHER PUBLICATIONS

Koji Yamada, et al, "GPS Navigator," Nippon Musen Gihou, No. 24 pp. 16–23, 1986.

*Primary Examiner*—Michael Zanelli
*Attorney, Agent, or Firm*—Stevens, Davis, Miller & Mosher

[57] ABSTRACT

A vehicle navigation system automatically corrects the coefficient of its velocity sensor with high precision. This system obtains a distance between two positions measured by a GPS and a linear travel distance calculated on the basis of the signals outputted by the velocity sensor during a period between the measurement of the two positions. Then, the system corrects the velocity sensor coefficient so that the linear travel distance becomes equal to the distance between the two positions.

6 Claims, 5 Drawing Sheets

FIG. 4A
FIG. 4C
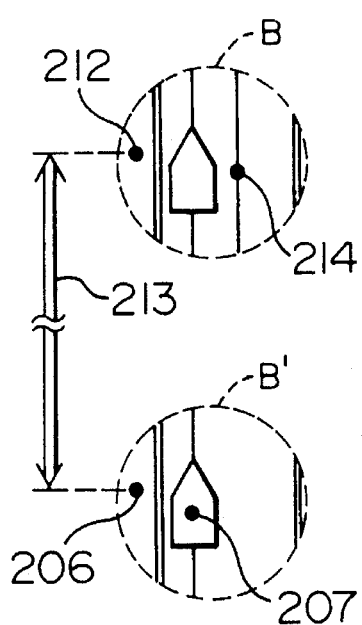
FIG. 4B
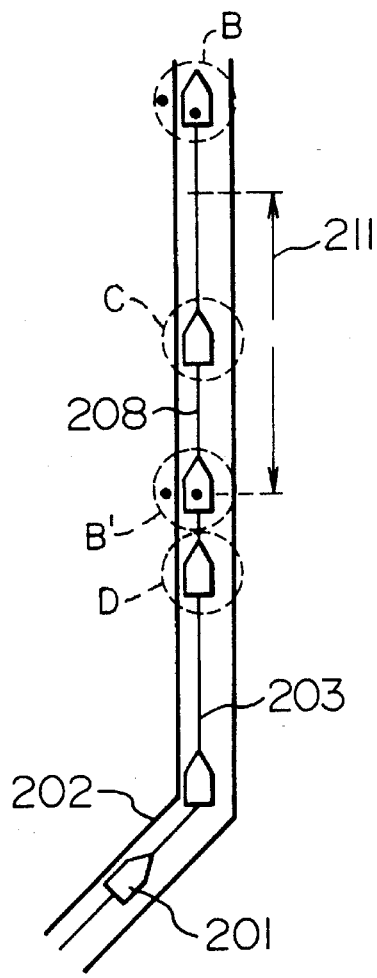
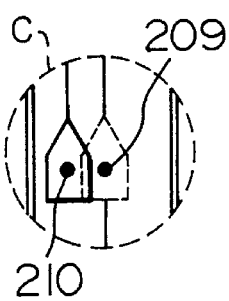
FIG. 4D

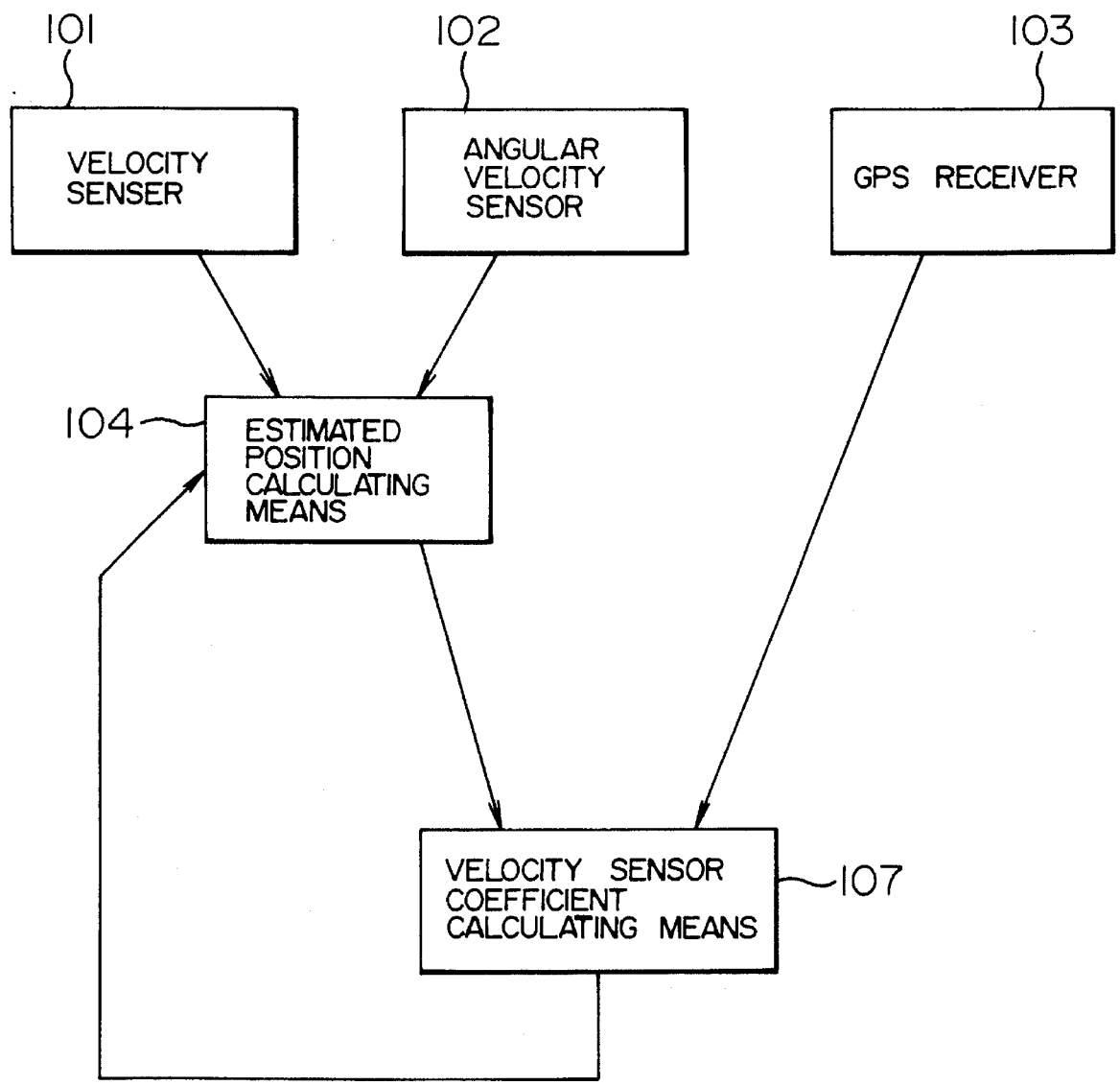

FIG. 6A
FIG. 6B
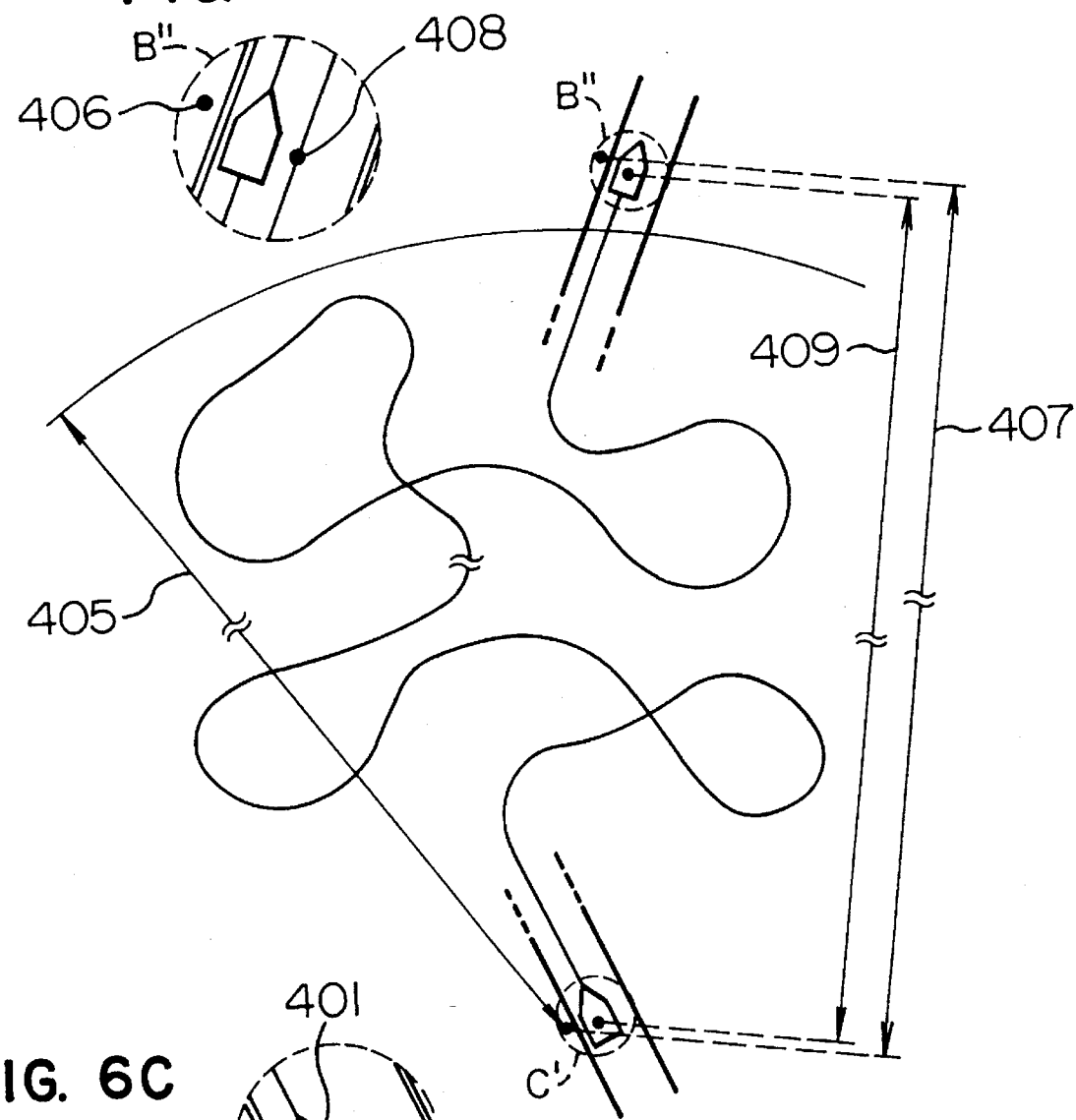
FIG. 6C
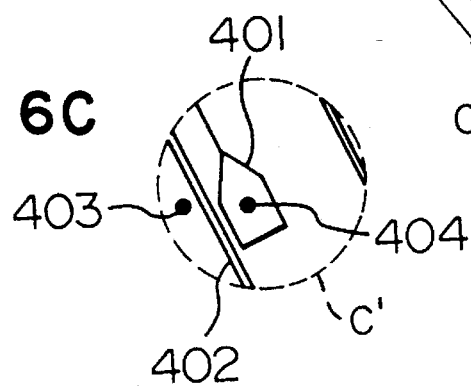

VEHICLE NAVIGATION SYSTEM USING GPS INCLUDING CORRECTION OF COEFFICIENTS FOR VELOCITY SENSOR

BACKGROUND OF THE INVENTION

1. Field of the Invention

The present invention relates to a navigation system, installed in a vehicle, which displays the position and direction of the vehicle, map information of an area around the vehicle, etc., and, more particularly, to a navigation system which calculates coefficients of devices, such as a velocity sensor, for obtaining a travel distance based on the rotation of the tires of the vehicle.

2. Description of the Related Art

A known vehicle navigation system obtains travel distances and rotational angles by using a velocity sensor or a distance sensor and an angle sensor and, based on the travel distances and rotational angles, determines the position and direction of the vehicle. If necessary, the vehicle's positional data is corrected by comparing a travel path of the vehicle with map data. Further, if a GPS (Global Positioning System), which measures the absolute position of a vehicle, is available, the position measured by the navigation system can be corrected so as to equal the position measured by the GPS (GPS position).

This known navigation system obtains a travel distance by a velocity sensor which detects pulses or the like outputted in accordance with the rotation of the tires of the vehicle and by the number of the detected pulses multiplied by a coefficient which is used for converting a number of pulses to a distance, that is, a coefficient of the velocity sensor.

The GPS cannot always fully function; for example, a sufficient number of satellites are usually not available for positioning in the vicinity of tall buildings or high mountains. Therefore, in the above-described known navigation apparatus, in order to perform sufficiently precise positioning even in such areas where GPS is not usable, the positioning precision of dead reckoning performed by using a velocity sensor and an angular velocity sensor must be substantially high. In order to maintain high positioning precision of the dead reckoning system, a user must correct the coefficient of the velocity sensor if the size of tires changes because of, e.g., age deterioration or pressure changes in the tires, or because the tires are changed. However, a change in this coefficient greatly affects the positioning precision, and it is not easy for the user to perform such a delicate correction.

To avoid this problem, a method has been developed in which the velocity sensor coefficient is automatically corrected by using map data, more specifically, by comparing the length of a travel path of a vehicle which is obtained on the basis of various positions of the vehicles calculated by the navigation system with the corresponding distance separately obtained from the road data of the map data. FIG. 1 illustrates this method. While the length of a travel path 503 between two corners 501 and 502 is being compared with the distance 504 therebetween obtained from road data, the velocity sensor coefficient is automatically corrected so that the travel path length 503 becomes equal to the distance 504 based on road data.

However, in this method, positioning precision sometimes deteriorates. As shown in FIG. 2, if there are two streets 602, 603 which are close to each other in the vicinity of a corner 601 and have similar appearances and directions, one street may be mistaken for the other. If the street 603 is mistaken for the street 602 on a map when the velocity sensor coefficient is going to be automatically corrected, the navigation system calculates such a velocity sensor coefficient that a travel path length 604 becomes equal to the distance 605 to the street 603 instead of the distance to the street 602, thus increasing any error in the velocity sensor coefficient. Therefore, the positioning precision is deteriorated.

Further, Japanese Patent Unexamined Publication No. 2-212714 discloses a method in which a ratio is obtained between an integrated travel distance of a travelling object which is obtained by the GPS navigation method using satellites and another integrated travel distance which is obtained by an independent navigation method using a distance sensor or the like, and the output of a distance sensor is corrected by using this ratio as a correction parameter.

In this method, however, a travel distance obtained on the basis of outputs of the sensor is likely to deviate from the actual travel distance if the distance between positioning points is great and the travel path has curves. Thus, the method will likely fail to precisely correct sensor outputs.

SUMMARY OF THE INVENTION

The present invention is intended to solve the above-described problems of the known art. Accordingly, an object of the present invention is to provide a vehicle navigation system which obtains precise velocity sensor coefficients which are used to multiply the outputs of a velocity sensor and thus achieves high precision in position measurement.

To achieve the above object, a navigation system according to the present invention automatically calculates sensor coefficients on the basis of either the ratio between a distance between two positions of the vehicle obtained externally and a linear travel distance obtained on the basis of the signals outputted by the sensor during the linear travel of the vehicle between the two positions of the vehicle, or the ratio between the distance between the two positions of the vehicle obtained externally and a linear distance between two estimated positions calculated respectively when one and the other of the two positions are obtained from the outside.

Therefore, according to the present invention, the velocity sensor coefficient is automatically corrected if the size of the tires changes due to age deterioration or pressure changes in the tire, or because the tires are changed. Further, the system of this invention can perform such correction without using map data, thus eliminating errors caused by the use of the map data.

Because a linear distance between estimated positions calculated simultaneously when positional data is obtained from the outside is used to obtain the distance ratio, the conditions of the travel path, such as curves thereof, between the estimated positions do not affect position measurement, thus achieving highly precise correction of the velocity sensor coefficient.

BRIEF DESCRIPTION OF THE DRAWINGS

FIG. 4A illustrates the operation of the navigation system illustrated in FIG. 3.

FIG. 4B illustrates enlarged views of the areas encircled in circles B and B' of FIG. 4A.

FIG. 4C illustrates an enlarged view of the area encircled in circle C of FIG. 4A.

FIG. 4D illustrates an enlarged view of the area encircled in circle D of FIG. 4A.

FIG. 5 is a block diagram of a navigation system according to the second embodiment of the present invention.

FIG. 6A illustrates the operation of the navigation system illustrated in FIG. 5.

FIG. 6B illustrates an enlarged view of the area encircled in circle B of FIG. 6A.

FIG. 6C illustrates an enlarged view of the area encircled in circle C of FIG. 6A.

DESCRIPTION OF THE PREFERRED EMBODIMENTS

Figure 1:
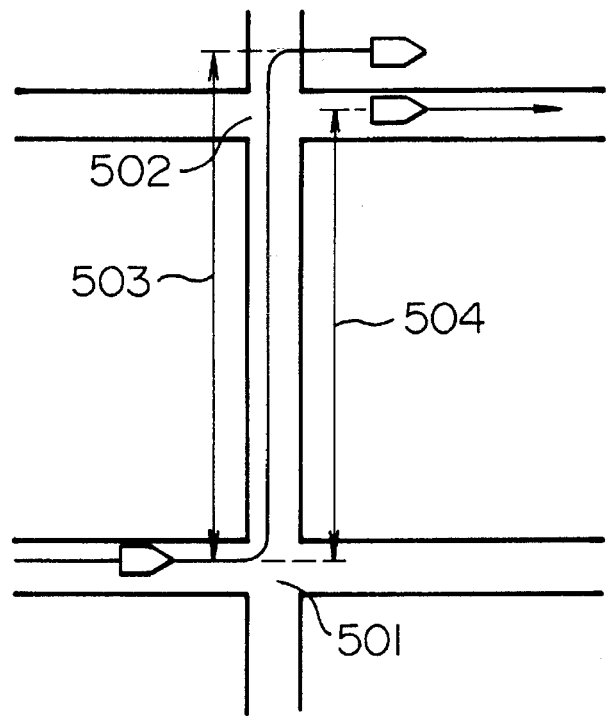
FIG. 1 illustrates the operation for calculating coefficients of a velocity sensor in a conventional navigation system.
Figure 2:
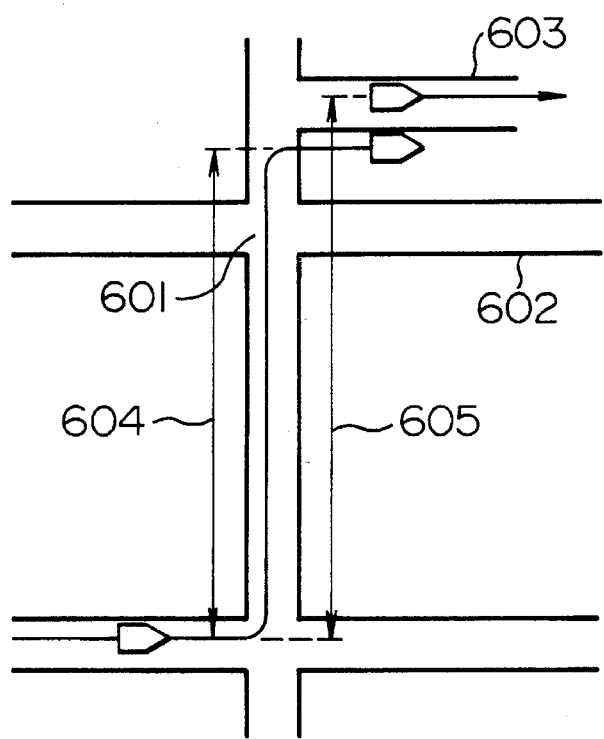
FIG. 2 illustrates problems of the operation illustrated in FIG. 1.
Figure 3:
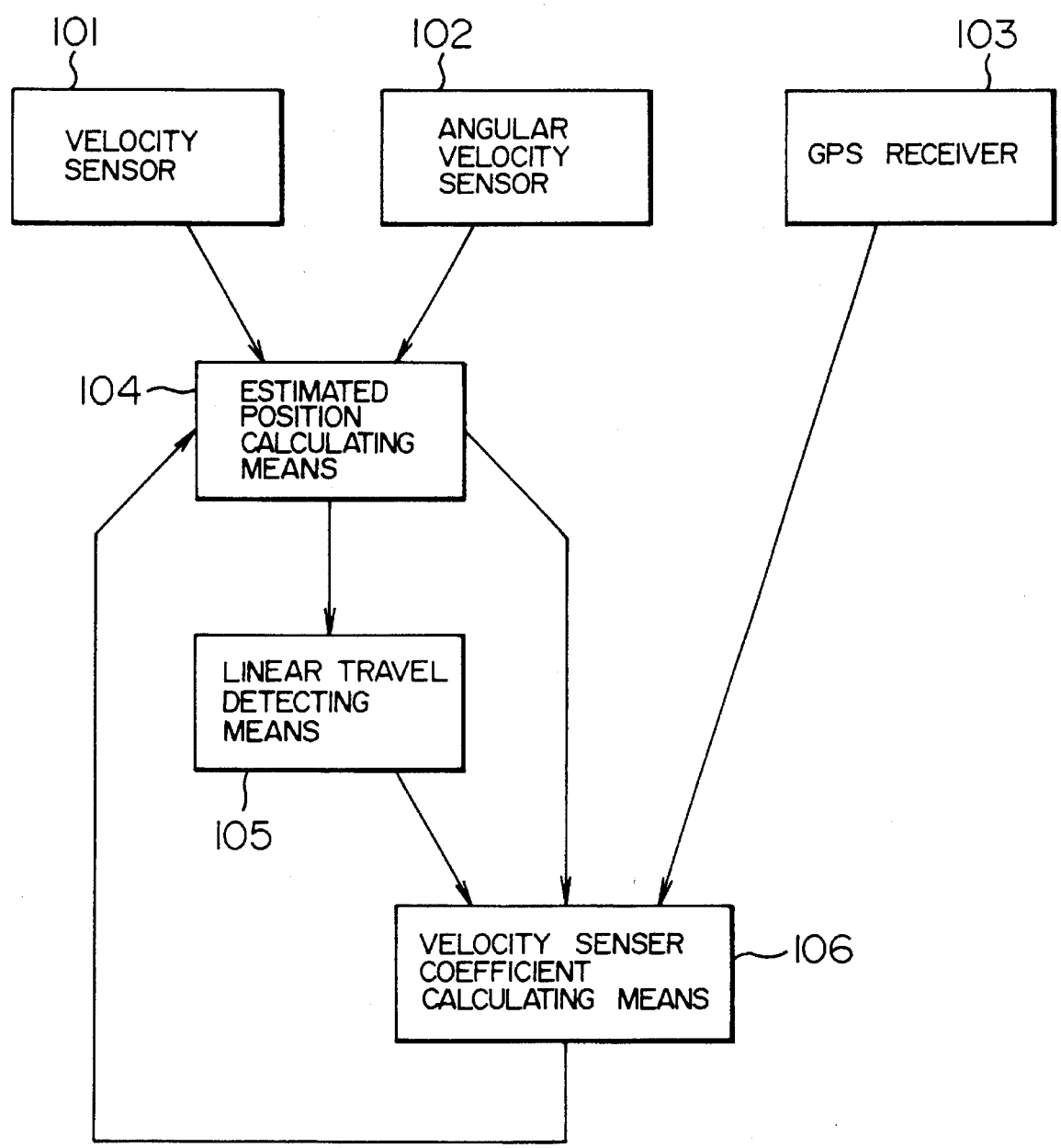
FIG. 3 is a block diagram of a navigation system according to the first embodiment of the present invention.

A navigation system according to the first embodiment of the present invention is illustrated in FIG. 3. In the figure, a velocity sensor 101 detects the velocity of a vehicle in which the navigation system is installed. More specifically, the velocity sensor 101 outputs a pulse every time the vehicle has travelled a predetermined distance. An angular velocity detector 102 detects angular velocity of the vehicle during travelling of the vehicle. Instead of the angular sensor 102, other types of direction sensors, such as geomagnetic sensors, may be used. Japanese Patent Unexamined Publication No. 63-262518 and others disclose a system in which a velocity sensor and a geomagnetic sensor are used to estimate the position of a vehicle. A GPS receiver 103 receives radio waves from a plurality of GPS satellites and outputs data on the position where the radio waves are received (referred to as the "GPS position" hereinafter). Such GPS receivers are described in detail in Nippon Musen Gihou, No. 24, pp. 16 to 23, 1986. An estimated position and direction calculating means 104 calculates current position and direction of the vehicle (current position and direction of the vehicle thus obtained are referred to as an "estimated position" and an "estimated direction" hereinafter) on the basis of signals outputted by the velocity sensor 101 and the angular velocity sensor 102. A linear travel detecting means 105 detects linear travel of the vehicle, on the basis of the estimated position and direction. A velocity sensor coefficient calculating means 106 calculates a velocity sensor coefficient on the basis of a ratio between a distance between two positions measured by the GPS (Global Positioning System) during the linear travel of the vehicle and a distance (a linear travel distance) obtained on the basis of output values which the velocity sensor 101 generates between when the first position of the two GPS positions is measured and when the second GPS position is measured.

The operation of the navigation system according to the first embodiment of the present invention will be described with reference to FIGS. 4A–D. In FIGS. 4A–D, a vehicle 201 travels on a road 202. At a point 204, it is found that the vehicle 201 has linearly travelled a predetermined distance or longer on a travel path 203. The navigation system corrects the estimated position 204 so that it coincides with a position 205 on which the vehicle is supposed to travel. The state of linear travelling is usually detected by discovering that changes in the travel direction of the vehicle remain within a predetermined angle over a predetermined distance or greater. This is an easy method for a vehicle navigation system, and the present invention uses this method.

A point 206 is a first GPS position measured by the GPS during linear travel of the vehicle. A point 207 is an estimated position of the vehicle calculated at a time when the first GPS position 206 is measured. At the point 207, the navigation system starts integration output values of the velocity sensor 101, that is, integration of values obtained by multiplying the output values of the velocity sensor 101, i.e., the number of pulses, by a coefficient. Then, at a point 209 where the linear travel detecting means 105 detects a linear travel of a predetermined distance or greater 208, the navigation system corrects the estimated position 209 so that it coincides with a position 210 on which the vehicle is supposed to travel. Because a vehicle must travel a predetermined distance or greater in order to calculate a velocity sensor coefficient, the estimated position 209 before correction is stored as well and renewed as an estimated position which is used to calculate a velocity sensor coefficient.

Then, when the vehicle has linearly traveled a predetermined distance 211 or greater and a second GPS position 212 is measured, the distance 213 between the two GPS positions 206 and 212 is obtained. Further, obtained is an estimated linear travel distance which is an integration on the basis of output values of the velocity sensor between the estimated position 207 calculated when the first GPS position 206 is measured and an estimated position 214 calculated on a travel path which has not been corrected by the navigation system, when the second GPS position 212 is measured. Next, a value is obtained by dividing the distance between the GPS positions by the estimated linear travel distance and defined as a new velocity sensor coefficient (see Expression (1)).

$$k_{pls}(n) = dl_{gps}/dl_{pls} \quad (1)$$

where:

$k_{pls}(n)$ is a new velocity sensor coefficient;

$dl_{gps}$ is a distance between two GPS positions; and $dl_{pls}$ is a distance obtained using values outputted by the velocity sensor during a period between measurements of the two GPS positions.

Instead of directly calculating a velocity sensor coefficient from a distance between GPS positions and an estimated travel distance, a new velocity sensor coefficient may be calculated by multiplying the ratio between these two distances by the previous velocity sensor coefficient as follows:

$$k_{pls}(n) = k_{pls}(n-1) \times dl_{gps}/dl_{pls} \quad (2)$$

where:

$k_{pls}(n)$ is a new velocity sensor coefficient;

$k_{pls}(n-1)$ is the previous velocity sensor coefficient;

$dl_{gps}$ is a distance between two GPS positions; and $dl_{pls}$ is a distance obtained using values outputted by the velocity sensor during a period between measurements of the two GPS positions.

Further, instead of immediately shifting to a new velocity sensor coefficient, the previous velocity sensor coefficient may be gradually converged to the target value so as to smooth changes of the coefficient due to rapid acceleration and deceleration of the vehicle, as follows:

$$k_{pls}(n) = k_{pls}(n-1) \times (1-\alpha+\alpha \times dl_{gps}/dl_{pls}) \quad (3)$$

where:

$k_{pls}(n)$ is a new velocity sensor coefficient;

$k_{pls}(n-1)$ is the previous velocity sensor coefficient;

$dl_{gps}$ is a distance between two GPS positions;

$dl_{pls}$ is a distance obtained using values outputted by the velocity sensor during a period between measurements of the two GPS positions; and α is a coefficient which determines the rate of convergence to the target value (0≦α≦1).

As described above, this embodiment, using the GPS instead of map data, automatically calculates a new velocity sensor coefficient by, for example, obtaining a ratio of a distance between two GPS positions in a linear travel section to a distance obtained by using the velocity sensor when the vehicle has linearly travelled in a period between measurements of the two GPS positions, or multiplying such a ratio by the previous velocity sensor coefficient. Therefore, a user of the navigation system does not need to correct velocity sensor coefficients. Further, the velocity sensor coefficient is automatically corrected without an error caused by misreading of map data. Still further, the velocity sensor coefficient is precisely corrected even if a travel path includes a curve.

Another embodiment which can correct the velocity sensor coefficient even when the vehicle is not linearly travelling will be described with reference to FIGS. 5 and 6A–C. FIG. 5 is a block diagram of such an embodiment, and FIGS. 6A–C illustrates the operation thereof.

FIG. 5 shows: a velocity sensor 101; an angular velocity sensor 102; a GPS receiver 103; estimated position calculating means 104 for calculating estimated position and direction of the vehicle by using the velocity and angular velocity sensors 101, 102; and velocity sensor coefficient calculating means 107 for obtaining a new velocity sensor coefficient by multiplying a ratio of a distance between two GPS positions measured by using the GPS to a distance between an estimated position of the vehicle obtained when the first one of the two GPS positions is measured and another estimated position obtained when the second GPS position is measured, by the previous velocity sensor coefficient.

Referring to FIG. 6A–C, a vehicle 401 travels along a road 402. In this embodiment, detection of the linear travel of the vehicle is not required. First, a first GPS position 403 measured by using the GPS and an estimated position 404 of the vehicle calculated when the first GPS position 403 is measured are stored. Then, a distance 407 from the first GPS position 403 to a second GPS position 406 which is farther than a predetermined distance 405 from the first GPS position 403 is obtained. Also, a linear distance 409 from the estimated position 404 to another estimated position 408 which is calculated without correction by the navigation system when the second GPS position 406 is measured. Then, the ratio between the distance 407 and the linear distance 408 is calculated and multiplied by the previous velocity sensor coefficient to obtain a new velocity sensor coefficient (see the following expression (4)).

$$k_{pls}(n)=k_{pls}(n-1)\times dl_{gps}/d2_{pls} \qquad (4)$$

where:

$k_{pls}(n)$ is a new velocity sensor coefficient;

$k_{pls}(n-1)$ is the previous velocity sensor coefficient;

$dl_{gls}$ is a distance between the GPS positions; and $d2_{pls}$ is a linear distance obtained using values outputted by the velocity sensor during a period between measurements of the two GPS positions.

Further, instead of immediately shifting to a new velocity sensor coefficient, the previous velocity sensor coefficient may be gradually converged to the target value so as to smooth changes of the coefficient due to rapid acceleration and deceleration of the vehicle, as follows:

$$k_{pls}(n)=k_{pls}(n-1)\times(1-\alpha+\alpha\times d1_{gps}/d2_{pls}) \qquad (5)$$

where:

$k_{pls}(n)$ is a new velocity sensor coefficient;

$k_{pls}(n-1)$ is the previous velocity sensor coefficient;

$dl_{gps}$ is a distance between two GPS positions;

$d2_{pls}$ is a linear distance obtained using values outputted by the velocity sensor during a period between measurements of the two GPS positions; and α is a coefficient which determines the rate of convergence to the target value (0≦α≦1).

As described above, this embodiment, using the GPS instead of map data, automatically calculates a new velocity sensor coefficient by, for example, obtaining a ratio of a distance between two GPS positions to a linear distance between two estimated positions calculated when the respective GPS positions are respectively measured, or multiplying such a ratio by the previous velocity sensor coefficient. Therefore, a user of the navigation system does not need to correct velocity sensor coefficients directly. Further, the velocity sensor coefficient is automatically corrected without an error caused by misreading of map data. Still further, because a linear distance between estimated positions of the vehicle calculated when the respective GPS positions are measured is used to obtain the distance ratio, the velocity sensor coefficient is precisely corrected no matter what travel path the vehicle has taken between the estimated positions.

A "GPS position" as described in the above two embodiments is not necessarily positional data directly outputted by the GPS receiver. For example, for the purpose of stabilization, a "GPS position" may be a central position of a predetermined number of plural positional data or plural positional data obtained in a period of a predetermined length (such as a mean position (centroid) of all these positions, or a position which provides the minimum sum of squares of distances therefrom to all the individual positions).

Though the above embodiments obtain positional data from the outside by using the GPS, positional data may be obtained from stations which transmit positional data, such as sign posts, as described in Japanese Patent Unexamined Publication No. 62-279720 and Japanese Utility Model Unexamined Publication No. 2-98533, providing substantially the same effects.

As described above in connection with the preferred embodiments, the navigation system of the present invention automatically correct the velocity sensor coefficient which changes due to age deterioration or the like, this system eliminates the need for a user to correct the velocity coefficient and, further, eliminates errors caused by correction of the velocity sensor coefficient on the basis of map data, thus achieving high-precision position measurement.

What is claimed is:

1. A vehicle navigation system comprising:

a first sensor for detecting a velocity of a vehicle;

a second sensor for detecting a direction of the vehicle;

estimated position calculating means for calculating an estimated position of the vehicle on the basis of outputs of said first and second sensors;

linear travel detecting means for detecting linear travel of the vehicle on the basis of a travel path of the vehicle obtained on the basis of a plurality of the estimated positions;

means for obtaining positional data of the vehicle received from outside of the vehicle; and sensor coefficient calculating means for calculating, only when a travel section of the travel path of the vehicle detected by said linear travel detecting means is linear, a coefficient of said first sensor on the basis of a ratio between (i) a distance between two positions of the vehicle in said linear travel section of the travel path of the vehicle detected by said linear travel detecting means, said two positions being obtained by said means for obtaining positional data of the vehicle, and (ii) a distance of linear travel of the vehicle calculated on the basis of signals outputted by said first sensor during a period between (a) when one of said two positions of the vehicle is obtained by said means for obtaining positional data of the vehicle and (b) when the other of said two positions of the vehicle is obtained by said means for obtaining positional data of the vehicle.

2. A vehicle navigation system according to claim 1, wherein said means for obtaining positional data of the vehicle is a GPS (Global Positioning System) receiver.

3. A vehicle navigation system according to claim 2, wherein said second sensor comprises an angular velocity sensor.

4. A vehicle navigation system according to claim 2, wherein said second sensor comprises a geomagnetic sensor.

5. A vehicle navigation system according to claim 1, wherein said second sensor comprises an angular velocity sensor.

6. A vehicle navigation system according to claim 1, wherein said second sensor comprises a geomagnetic sensor.

* * * * *